United States Patent Office 2,696,087
Patented Dec. 7, 1954

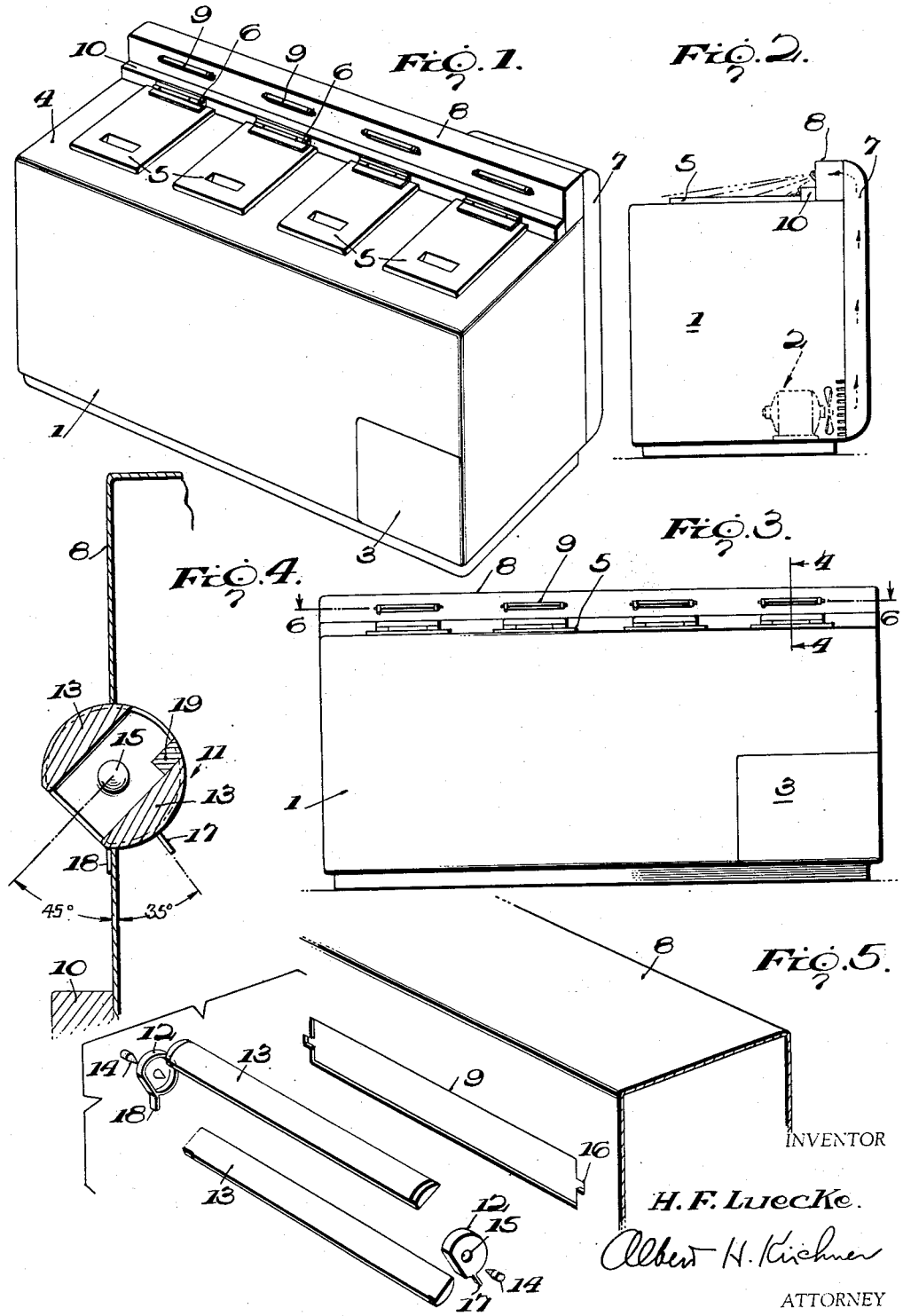

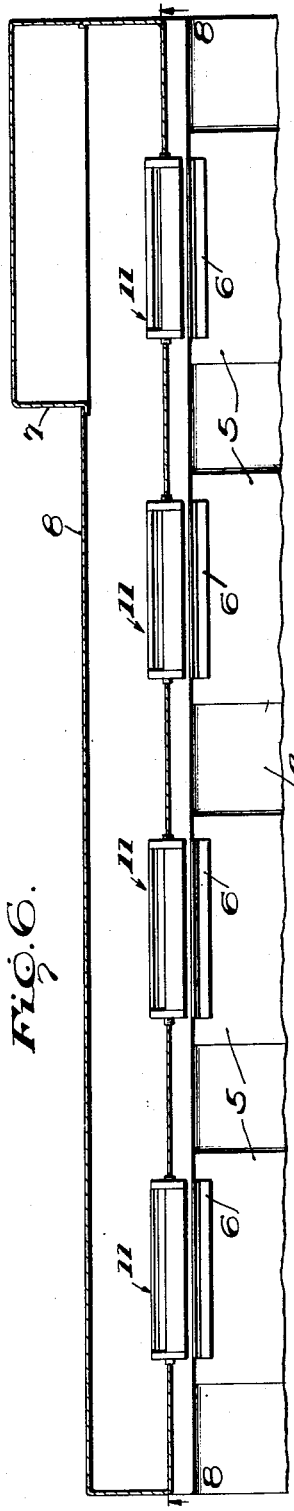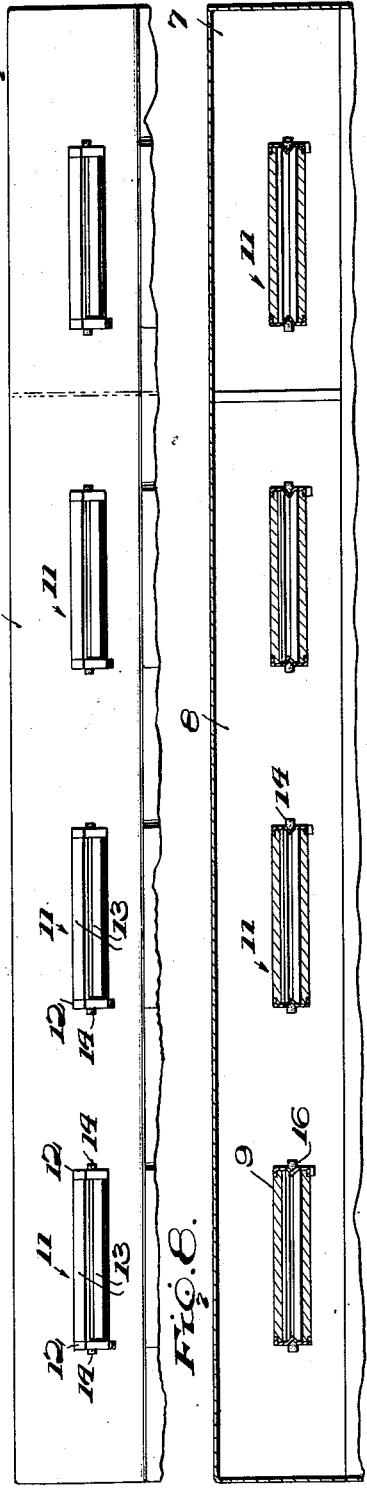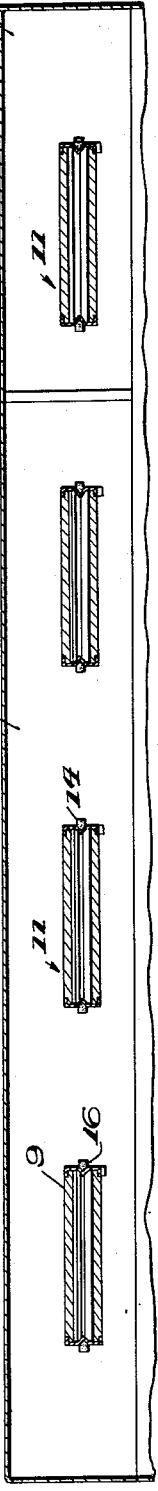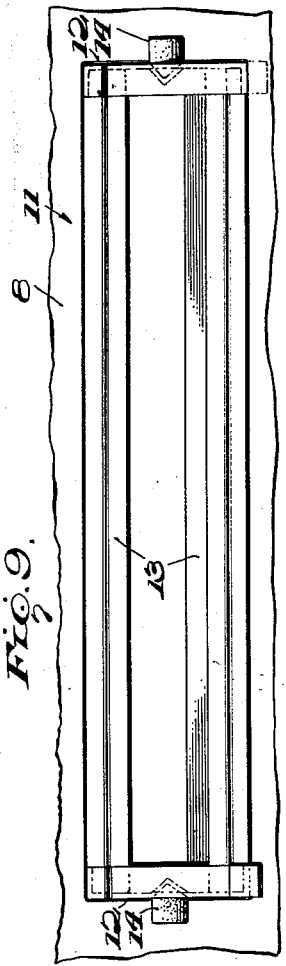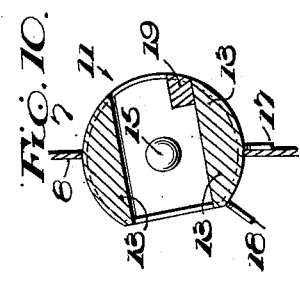

2,696,087

FROZEN FOOD MERCHANDISING CABINET HAVING MEANS TO PREVENT CONDENSATION ON LIDS

Harry F. Luecke, Herndon, Va., assignor to Southern Dairies, Inc., Washington, D. C., a corporation of Delaware Application July 8, 1952, Serial No. 297,658

7 Claims. (Cl. 62—89)

The present invention relates to cabinets for frozen food and the like, and particularly to such cabinets as are used in merchandising frozen food in self-service retail stores.

Cabinets of this kind are commonly of the chest or horizontal, as distinguished from the upright, type, and have a horizontal top surface provided with one or more openings affording access to the interior storage space, with each opening equipped with a closure in the form of a lid. The lids are preferably hinged at their rear so that they can normally be kept closed to prevent excess loss of refrigeration and, in order to display the cabinet contents to prospective purchasers, they are made of clear plate glass or transparent plastic. However, the very considerable temperature differential to which the inner and outer surfaces of the lids are subjected causes atmospheric moisture to condense on their outer surfaces, which is objectionable because it impairs their transparency and because the water of condensation tends to be shed into the cabinet chambers when the lids are raised about their hinges.

The principal object of the invention is to prevent condensation on the lids so that they will be kept clear, dry and fully transparent.

Another object of the invention is to utilize for such condensation-preventing purposes the warm air discharged from the condenser coil fan forming part of the refrigerating mechanism which is commonly built into the cabinet.

The broad, basic concept just explained is not new. It has heretofore been proposed to conduct air discharged by the condenser fan and direct it horizontally across the series of top closures seriatim or successively beginning with a side of one endmost closure. However, that construction has not proved practical because it has been found that the most remote of the series of closures receives none of the air, or insufficient air, and because the location of the discharge opening adjacent a side of one of the closures tends to direct air into the cabinet chamber beneath that one closure when it is open, thus warming that particular chamber.

A more specific object of the invention therefore is to improve the prior art arrangement by obviating the foregoing and other objections.

A related object is to provide a construction in which all the closures of a series in a single cabinet will be supplied with condensation-preventing air at substantially the same rate and in which none of the air will be admitted to any open chamber or compartment.

Other and further objects and advantages of the new construction will be apparent to those skilled in the art from the following explanation of the invention as incorporated in the preferred embodiment shown in the accompanying drawings, in which Figure 1 is a perspective view of a cabinet embodying the principles of the invention;

Fig. 2 is an end elevational view;

Fig. 3 is a front elevational view;

Fig. 4 is a detail cross-sectional view, on an enlarged scale, taken on the line 4—4 of Fig. 3, showing one of the air nozzles or guide means at one limit of its range of adjustment;

Fig. 5 is an exploded perspective view of a portion of the air chamber and one of its nozzles;

Fig. 6 is a detail horizontal cross-sectional view, on an enlarged scale, taken through the air chamber on the line 6—6 of Fig. 3;

Fig. 7 is a detail front elevational view of the air chamber;

Fig. 8 is a detail vertical sectional view taken through the air chamber on the line 8—8 of Fig. 6;

Fig. 9 is a relatively enlarged front elevational view of one of the adjustable air nozzles; and Fig. 10 is a detail cross-sectional view like that of Fig. 4 but showing the air nozzle at the opposite limit of its range of adjustment.

But it is to be understood that the specific construction shown in these figures is exemplificative merely, and not restrictive, since the mechanical details of the structure can be varied widely within the principles of the invention as defined by the broader of the appended claims.

Referring to the drawings, Fig. 1 shows at 1 the body of a cabinet of generally conventional design having at 2 a compressor-condenser-expander type of refrigerating mechanism enclosed within a built-in compartment 3 for refrigerating a plurality of well insulated chambers or compartments formed in the cabinet for containing ice cream and other frozen foodstuffs. The cabinet is provided with a horizontal top surface 4 having an opening affording access to each of the storage chambers, with each opening equipped with a lid or other closure 5. These closures are preferably fixed in place, as by being hinged to the cabinet top, and the hinges are best located at the back or rear edge of each lid, as shown at 6. The hinges may, if desired, be of the built-in spring type to make the lids self-closing. In any event the lids are preferably made of plain or framed sheets of clear plate glass or plastic or equivalent transparent material so that the contents of the food storage compartments of the cabinet can be seen through them.

Instead of permitting the warm air from the condenser coil fan of the refrigerating mechanism 2 to be discharged directly into the room from the mechanism compartment 3, a duct 7 is arranged over the compartment outlet and extended vertically up the adjacent cabinet wall, conveniently a rear wall, to an outlet at the top rear of the cabinet and is there connected to an air chamber 8 which extends along the full length of the rear of the cabinet top. This chamber, which is a box-like structure of sheet metal, is fully enclosed except for apertures 9 aligned along its front, one directly behind and above the level of each of the closures 5 so that all the air which the duct 7 supplies to the chamber will be discharged through these apertures.

It is convenient to interpose a spacing strip 10 between the front wall of the air chamber and the backs of the closures 5, and this strip provides a good mount for the closure hinges.

The apertures 9 are in the form of slots, and an important feature of the invention is concerned with equipping these slots with means for directing the issuing air most efficiently down on to the closures, both with respect to the angle of impingement and with respect to the relative volumes discharged by the several apertures, so that all the closures will be served substantially equally regardless of their proximity to or distance from the end of the chamber to which air is delivered by the duct 7.

This is accomplished, in the preferred embodiment of the invention, by mounting in each of the apertures 9 a directionally and volumetrically adjustable nozzle 11 which is best shown in Figs. 4, 5, 9 and 10. This nozzle in the preferential form shown is generally cylindrical in overall shape, comprising a pair of stamped metal end cups 12 press fitted over the ends of a pair of spaced parallel filler strips 13 which are each bounded by an outer cylindrical surface and an inner plane surface and each being much less than half-cylindrical so that a substantial orifice or throughway is provided between the pair of spaced plane faces, as best appears in Figs. 4, 9 and 10.

To make each nozzle directionally adjustable, so that the air issuing from it will be directed downwardly on to the top surface, and substantially the whole top surface, of the adjacent lid 5, at such angle as experience may show to be the most efficient for inhibiting condensation over the whole closure area, each of the end cups 12 is mounted for rotation, and hence for rotation of the nozzle as a whole, in the ends of its aperture 9. A simple and entirely practical and satisfactory form of mounting comprises seating the opposite ends of a friction pintle, made of rubber or the like, in an inwardly directed socket 15 in each end cup and in an outwardly directed indentation 16 formed in the front wall of the air chamber 8 at the adjacent end of the aperture 9. This permits the nozzle to be rotated to direct its throughway at an adjusted angle down on to the surface of the adjacent closure.

In order to make certain that this angle will always be one of declination down on to the closure surface, and so that at no time will the path of air through the nozzle be upwardly inclined or even as high as horizontal, i. e., parallel to the surface of the closed lid, adjustment limits are provided. These may take the form of lugs or ears 17, 18 formed on the respective cups 12 of each nozzle and projecting more or less radially therefrom so as to abut the front wall of the air chamber and thereby limit rotation of the nozzle. In the preferred form of this feature of the invention one of the lugs, e. g., the lug 17, is positioned to project inside the air chamber and therefore to abut the inner surface of the front wall thereof to limit rotation of the nozzle upwardly toward horizontal direction of the issuing air stream, and the other lug, formed on the other cup, is positioned to project outside the air chamber and therefore to abut the outer surface of the front wall thereof to limit rotation of the nozzle downwardly toward vertical or straight down direction of the issuing air stream.

Neither full horizontal nor full vertical direction is desirable. I have found that a direction somewhere in the range between approximately 45° and approximately 80° to the vertical, shown respectively in Figs. 4 and 10, is adequate in all cases to cover all the area of even the longest lids with sufficient air to prevent condensation. The actual optimum inclination is best found empirically in each installation, being a function of lid length, volume and temperature of air and frequency of its discharge, cabinet and room temperature and humidity, and other variables; hence the need for rotational adjustment of the nozzles. I have found also that it is frequently necessary or desirable to set the different nozzles of a single cabinet at different angles varying with their distance from the supply duct 7; hence the need for individual, separate rotation adjustability.

In order to cause substantially the same amount of air to be discharged in unit time from the several apertures 9, regardless of their proximity to or distance from the supply duct 7, the invention provides a constrictor strip 19 which is affixed to the plane surface of one or the other of the filler strips 13, as best shown in Figs. 4 and 10. It will be evident that by providing these constrictor strips in different thicknesses, they can be selected for installation in the different nozzles so that the cross-sectional areas of the several throughways will all be different, with the cross-sectional area increasing progressively with the distance from the supply duct 7. Thus, while the pressure of air in the chamber 8 will be greatest near the supply duct, and lowest at the remote end of the chamber, the rate of discharge of air from the several apertures 9 can be made substantially uniform so that all the closures 5 will be treated alike and condensation on all of them will be inhibited with substantially the same efficiency.

The constrictor strips may be secured in place by cementing them, either permanently or removably, to the filter strips 13, or they may be press fitted like the filler strips in the end cups 12.

It will be evident from the foregoing that adjustments can be made by which air issuing from the apertures 9 will at all times during operation of the condenser coil fan be directed down obliquely on to all the closures 5 at the optimum angle and at the same rate, or at selected different rates as is sometimes found desirable, which is believed to be a new result in this art.

It will be evident also that opening of any lid while the fan is in operation will not result in warm air entering the opened refrigerated compartment because the compartment will be effectively shielded from the adjacent nozzle by the upstanding lid and air issuing from the nozzle will be deflected to the sides of the lid to be dissipated into the room and kept from entering the compartment.

Most of the parts are easily made of sheet metal of suitable gauge and finish, which may be made to correspond to those of the cabinet walls, although this of course is not material to the spirit of the invention. The strips 13 and 19 may be made of wood.

I claim:

1. In a cabinet for frozen food and the like having a horizontal top surface provided with an interior access opening and a closure therefor hinged at its rear to said surface, an air chamber adjacent said top surface having an upright wall extending above said surface in the rear of said hinged closure and provided with an aperture entirely above the level of the closure, and guide means cooperating with said aperture to direct air under pressure in the chamber obliquely down on to the closure.

2. In a cabinet for frozen food and the like having a horizontal top surface provided with a plurality of interior access openings and a closure for each opening, an air chamber adjacent said top surface having an upright wall extending above it and provided with a plurality of longitudinally aligned slots, one adjacent each of the closures, means for varying the effective width of each of the slots, and means for supplying air under pressure to the chamber to be discharged through the slots on to the closures.

3. In a cabinet for frozen food and the like having a horizontal top surface provided with a plurality of interior access openings and a closure for each opening, an air chamber adjacent said top surface having an upright wall extending above it and provided with a plurality of longitudinally aligned slots, one adjacent each of the closures, and an air supply duct connected to the chamber adjacent an endmost slot, said slots being of progressively reduced width successively toward the slot at the opposite end whereby air is discharged from each of said slots at substantially the same rate.

4. In a cabinet for frozen food and the like having a horizontal top surface provided with a plurality of interior access openings and a closure for each opening hinged at its rear to the back portion of the top surface, an air chamber mounted on said top surface behind said hinged closures and having an upright wall extending above the top surface and provided with a slot adjacent each closure, and an air supply duct connected to the chamber adjacent one of the slots, said slots being of progressively reduced width in direct proportion to their distance from said duct whereby air is discharged from each of said slots at substantially the same rate.

5. In a cabinet for frozen food and the like having a horizontal top surface provided with a plurality of interior access openings and a closure for each opening hinged at its rear to the back portion of the top surface, an air chamber mounted on said top surface behind said hinged closures and having an upright front wall extending above the top surface and provided with a slot adjacent each closure, an air supply duct connected to the chamber adjacent one of the slots, a duct connected to the chamber for supplying air thereto, and adjustable means in said slots for directing air from the chamber at varying selected angles obliquely down on to said closures.

6. In a cabinet for frozen food and the like having a horizontal top surface provided with a plurality of interior access openings and a closure for each opening hinged at its rear to the back portion of the top surface, an air chamber mounted on said top surface behind said hinged closures and having an upright front wall extending above the top surface and provided with a horizontal slot adjacent each closure and approximately equal in length to the width thereof, an air supply duct connected to the chamber adjacent one of the slots, a duct connected to the chamber for supplying air thereto, and means in said slots for adjusting the effective width thereof and for directing air from the chamber at varying selected angles obliquely down on to said closures.

7. In a cabinet for frozen food and the like having a horizontal top surface provided with a plurality of interior access openings and a closure for each opening, an air chamber adjacent said top surface having an upright wall extending above it and provided with a plurality of longitudinally aligned slots, each slot being equally adjacent one of said closures, means for supplying air under pressure to the chamber to be discharged through the slots, and means for directing said air obliquely downwardly onto the closures.

(References on following page)

References Cited in the file of this patent

UNITED STATES PATENTS

| Number | Name | Date |
|---|---|---|
| 2,462,705 | Abeling | Feb. 22, 1949 |
| 2,542,136 | Hanson | Feb. 20, 1951 |
| 2,558,997 | Voelker | July 3, 1951 |

FOREIGN PATENTS

| Number | Country | Date |
|---|---|---|
| 580,093 | Great Britain | Aug. 27, 1946 |